Aug. 11, 1942.     H. G. SPECHT     2,292,906
SWING GATE VALVE
Filed July 10, 1941     2 Sheets-Sheet 1
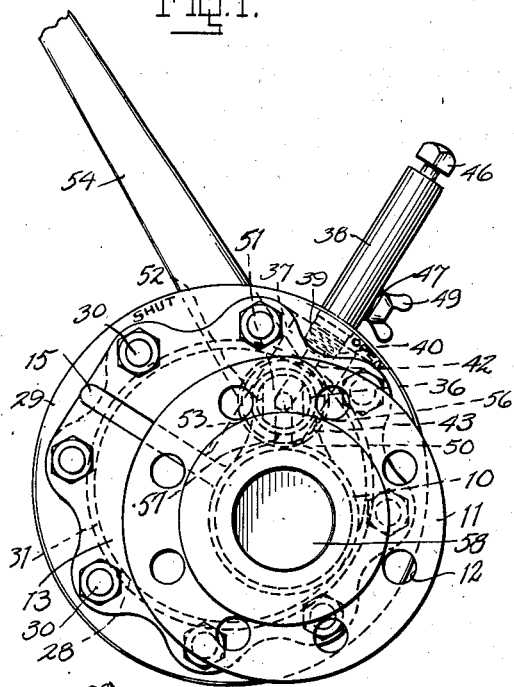
INVENTOR
HARRY G. SPECHT.
BY
ATTORNEY Aug. 11, 1942.  H. G. SPECHT  2,292,906
SWING GATE VALVE
Filed July 10, 1941  2 Sheets-Sheet 2
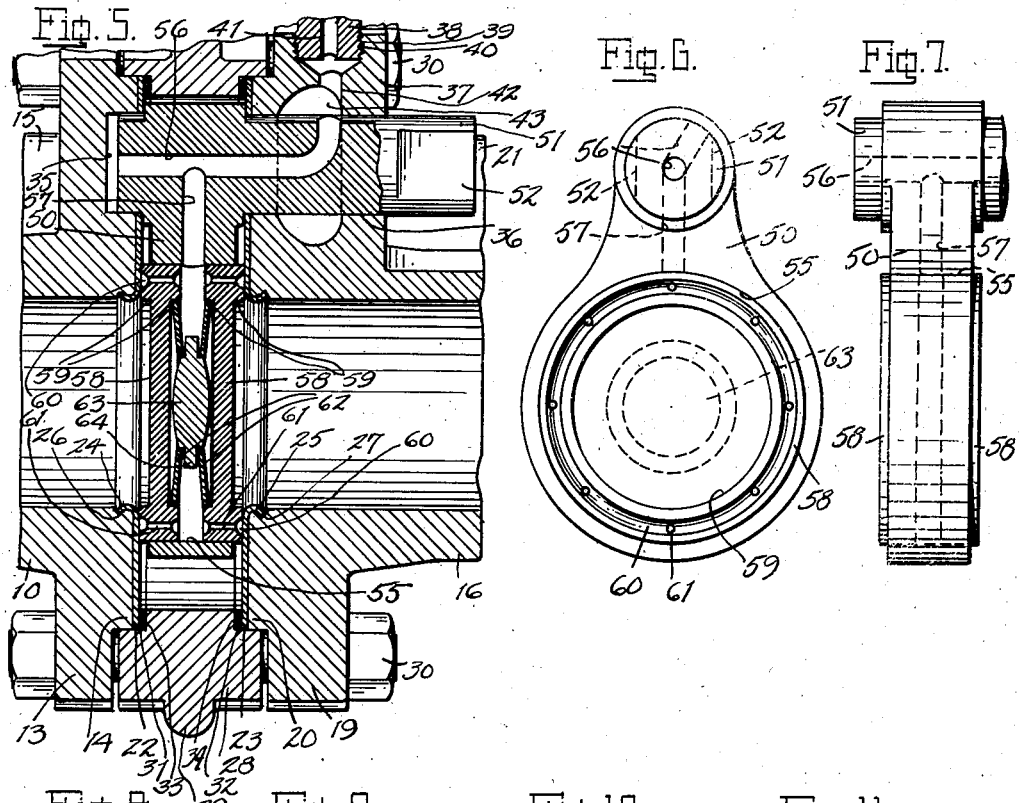
INVENTOR
HARRY G. SPECHT.
BY
ATTORNEY Patented Aug. 11, 1942

2,292,906

UNITED STATES PATENT OFFICE 2,292,906

SWING GATE VALVE

Harry G. Specht, Montclair, N. J., assignor to Encor Corporation, Belleville, N. J., a corporation of New Jersey Application July 10, 1941, Serial No. 401,707

4 Claims. (Cl. 251—18)

The present invention relates to a swing gate valve, specially intended for use with gaseous or liquid fluids which require a leak-proof seal under such conditions as high pressure, high temperature, volatility, and the like. With the usual type of solid valve gate, having a metal to metal seat, such fluids create a pressure upon one side of the gate allowing the fluid to leak past the seat at one side and thereupon gradually leak past the seat at the other side, causing an equalization of pressure at each side. Such valves are extremely difficult to lubricate as the leakage causes the lubrication medium applied to the valve seats to be forced out by the pressure and consequently it is difficult to operate such valves to open and close the gate.

It is an object of the present invention to provide a swing gate valve having spring-pressed seat-engaging discs at each side which are adapted to be pressed into engagement with the seating surfaces by the combined pressure of the spring means and the line pressure which is admitted between the discs upon the initial closing of the valve, this combined pressure being in excess of the line pressure and thus effectually sealing the valve against leakage.

It is a further object to provide lubricating means for supplying for lubrication under pressure to the valve seats, for the purpose of providing a lubricated leak-proof seal at each side of the valve which will facilitate the opening and closing of the valve gate. It is further proposed to provide such lubricating means including an annular lubricating seal disposed around the stem of the valve gate, such annular seal being in communication with the lubricating means of the valve seats.

It is a further object to provide lubricating means which may be applied to the valve seats under pressure in the closed position of the valve, so that after the valve discs are subjected to the combined spring and line pressure the lubricant may be forced under pressure to the valve seats.

With the above and other objects in view embodiments of the invention are shown in the accompanying drawings, and these embodiments will be hereinafter more fully described with reference thereto, and the invention will be finally pointed out in the claims.

In the drawings:

Fig. 1 is an end view of a swing gate valve, according to an exemplary illustrated embodiment of the invention, the swing gate being shown in closed position.

Fig. 2 is a side elevation.

Fig. 3 is a transverse vertical sectional view taken along the line 3—3 of Fig. 2, and showing the swing gate chamber of the valve, the full lines showing the swing gate in closed position and the dot-and-dash lines showing it in open position.

Fig. 4 is a vertical longitudinal sectional view taken along the offset and inclined line 4—4 of Fig. 3.

Fig. 5 is a fragmentary sectional view, similar to Fig. 4, and on an enlarged scale.

Fig. 6 is a front elevation of the valve gate in detached relation.

Fig. 7 is a side elevation thereof.

Fig. 8 is a fragmentary sectional view of a modified form of the swing gate, fragmentary portions of the valve seats being shown in relation thereto.

Fig. 9 is a front elevation of the swing gate illustrated in Fig. 8.

Fig. 10 is a vertical sectional view of another modified form of swing gate, fragmentary portions of the valve seats being shown in relation thereto.

Fig. 11 is a front elevation of the swing gate shown in Fig. 10.

Similar reference characters indicate corresponding parts through the several figures of the drawings.

Referring to the drawings, the swing gate valve, according to the exemplary embodiment of the invention shown in Figs. 1 to 7, inclusive, comprises a valve body consisting of a tubular conduit member 10 at one side, having a circular pipe-fastening flange 11 at its outer end provided with bolt holes 12 for securing an adjacent section of pipe thereto, and provided at its inner end with a wall flange 13, having a scalloped periphery, and provided upon its inner face with a circular raised valve seat 14, having its center eccentric to the center of the conduit 10 to provide a sufficient space at one side of the conduit to receive the valve gate in its open position, the valve gate in its closed position being centered upon the conduit. A radial reinforcing rib 15 is provided along the conduit member 10 between the flanges 11 and 13. A substantially similar tubular conduit member 16 forms the other side of the valve body and is provided at its outer end with a circular pipe-fastening flange 17, having bolt holes 18 for securing an adjacent length of pipe thereto, and provided at its inner end with a wall flange 19, having a scalloped periphery, and having a circular raised valve seat 20, similar to the seat 14 of the conduit member 10. A radial reinforcing rib 21 is provided along the conduit member 16 between the flanges 17 and 19.

The valve seats 14 and 20 of the members 10 and 15 are preferably provided with metal facings 22 and 23 respectively secured by spinning over their inner edges, as at 24 and 25, into annular recesses 26 and 27 respectively provided at the inner ends of the conduits of the members 10 and 16. These facing members may be constructed of any suitable material, depending upon the requirements of the particular valve, it being understood that they are intended to provide a hard, smooth valve face which will not deteriorate under the influence of fluid flowing through the valve. They may, for instance, be made of stainless steel.

Between the two conduit members 10 and 16 there is provided a circular center piece in the form of a ring 28, cylindrical at its inner periphery and scalloped at its outer periphery, to conform to the outer peripheries of the conduit members, and having a projecting circular reinforcing rib 29 disposed centrally. The wall flanges 13 and 19 of the two conduit members and the center piece 28 are provided with aligned bolt holes, and the three parts of the valve body are secured together by bolts 30 engaged through these holes. Suitable packing rings 31 and 32 are disposed in annular recesses 33 and 34 at the respective sides of the inner peripheries of the center piece 28 and these packing rings are compacted into sealed relation by tightening of the bolts.

The wall flange 13 of the conduit member 10 is provided in vertically aligned position above the conduit with a bearing recess 35 for the valve stem and the wall flange 19 of the conduit member 16 is provided in axial alignment with this recess with a cylindrical valve stem bearing passage 36. The wall flange 19 is provided with an enlargement 37 extending to its periphery and disposed radially of the valve stem passage 36 and which provides a mounting for the grease gun element 38, the threaded end 39 of which is screwed into a threaded opening 40 in said enlargement. The passage 41 of the grease gun is in communication through a radial passage 42 in the enlargement with an annular grease receiving space 43 surrounding the bearing passage 36 and adapted, as will presently more fully appear, to provide a lubricant seal for the valve stem. The grease gun is provided at its outer end with an enlarged threaded reservoir 44 for receiving grease and a pressure screw 45 engaged therein, having a nut head 46 at its outer end for turning the pressure screw by means of a suitable wrench. Within the passage 41 there is provided a transverse stop cock 47 which in its open position has its passage 48 aligned with the passage 41 and in its closed position closes the passage 41. The stop cock is provided with a wing-nut operating handle 49.

The disc-holder member 50 of the valve gate has its stem 51 rotatably engaged in the bearing passage 36 and the bearing recess 35, the outer end of the stem projecting beyond the passage 36 where it is provided with flats 52 for engagement by the hub 53 of the wrench 54. The disc-holder member, which is disposed in the circular cylindrical valve gate chamber formed by the two conduit members and the center piece, is of circular form at its depending portion below the stem and is provided with a circular opening 55 for receiving the valve discs. The valve stem 51 is provided with an axial passage 56 extending from its inner end to an intermediate point where it is extended at an angle to the surface of the valve stem at a point in register with the annular space 43, and this passage 56 is connected by a passage 57 to the circular disc-receiving opening 55, thus providing a passage for lubricant from the grease gun around the circular passage 43 through the passages 56 and 57 to the disc-receiving opening for the purpose of supplying grease between the discs and to the valve seats, as will hereinafter more fully appear. The recess 35 is spaced from the inner end of the valve stem to provide a grease-receiving sealing space at the inner end of the stem, and which in connection with the seal provided by the sealing space 43 effectually seals the interior of the valve against leakage around the valve stem.

Within the circular opening 55 there are slidably engaged a pair of disc members 58—58, each having circular recesses 59—59 at their inner and outer sides of substantially corresponding diameter to the conduit passages through the members 10 and 16, the relatively thick annular rim portions being disposed circumferentially outwardly of the conduit passages, so that the outer faces of the rim portions of each of the disc members engages the respective seating faces provided by the facing members 22 and 23. Within each of the faces of the rim portions there is provided a continuous annular groove 60, which is preferably of outwardly divergent cross-section and may be of any suitable shape, as for instance semi-circular, as shown, and these grooves at each side are connected by a series of spaced ports 61 so that grease disposed between the two discs, and which is fed thereto from the grease-gun through the annular space 43 and the passages 56 and 57 of the valve stem, will be forced under pressure of the grease-gun through the ports 61 to the annular grooves 60 where it will flow in the form of a continuous annular lubricant seal in engagement with each of the seating faces of the valve.

Spring means are disposed between the two discs to force them outwardly into engagement with the valve seating faces, as well as spacing stop means to space and limit the movement of the discs toward each other under the line pressure of the fluid in the conduit passage of the valve. In the embodiment shown in Figs. 1 to 7 this spring and stop means consists of a pair of dished ring-shaped metal spring washers 62—62, preferably of the "Belleville" type, and a circular block 63 having a circular rim flange 64 at its periphery providing annular corner recesses at each side in which the inner peripheral edges of the washers 62—62 are engaged, the faces of the block being of convex form and adapted to engage the disc members centrally at a predetermined point of movement of the disc members toward each other.

The outer peripheral edges of the washers 62—62 are engaged with the annular peripheral walls of the recesses 59—59 at the inner sides of the two discs. The thickness of the block 63 is such in relation to the width of the valve gate chamber, that is the distance between the surfaces of the facing members 22 and 23, that the springs 62—62 may exert pressure to move the gate valve discs 58 outwardly to a slight extent to engage their seating rims with the valve faces, this arrangement permitting a slight movement of the discs toward each other, under the force of the line pressure in the conduit passage and against the expansive force of the springs 62, to the point where the two discs and the spacing block 63 will constitute a solid structure pressed toward the opposite valve face by the force of the line pressure.

In practice the strength of the springs 62—62 is calculated so that it will be substantially less than the line pressure, that is, for instance, 25 pounds pressure of the springs per square inch compared with 100 pounds per square inch of the line pressure. In operation the line pressure of the fluid at the time of closing of the valve will be imposed against the disc 58 at one side and being in excess of the expansion pressure of the springs 62—62 will compress these and through the spacing block 63 will press the other disc 58 against the valve face at the side of the valve where there is zero pressure. This will allow a leakage of the line pressure, permitting it to pass the seat at the pressure side and flow through the ports 61 between the discs 58—58 whereupon it exerts outward pressure upon the two discs substantially equal to the sum of the line pressure plus the pressure of the spring washers 62—62, so that at this point the two discs are under an outward pressure in excess of the line pressure. Consequently an effective sealing of the valve against seating faces 22 and 23 takes place to prevent leakage. After the valve is closed and the pressure established upon the valve discs, as above outlined, the grease-gun may be operated to force grease under pressure into the channels 60, thus providing a lubricant seal at each side which assures against leakage and so lubricates the valve seats that the valve gate may be readily opened when desired, despite the relatively great pressure with which the valve discs are pressed into engagement with the valve seats.

It will be observed that the valve structure, as shown in Figs. 1 to 7, is symmetrical at each side of the valve gate so that the valve will operate in connection with the flow of fluid in either direction. The valve discs 58 are similarly formed at each side so that they can be readily reversed to provide new seating surfaces in the event that there is any deterioration in the seating surface first put into use.

In Figs. 8 and 9 there is illustrated a modified form of the invention, in which the valve gate discs 65—65 are in the form of sheet-metal stampings of cup shape, each having an inwardly extending rim flange 66 which engages slidably with the circular opening 55 of the disc holder, the face of the disc being provided adjacent this flange with an inwardly pressed annular groove 67, preferably of semi-circular cross-section, having a series of port openings 68 therein through which grease may flow under pressure from the space between the discs to the annular groove to provide a lubricant seal. Centrally the discs are each provided with an inwardly embossed bearing stud 69 upon which the reduced shouldered end portions 70—70 of a cylindrical limit stop member 71 are slidably engaged, spring washers 72—72 preferably of the dished or "Belleville" type, being engaged at their inner peripheries with the shouldered ends of this stop member and at their outer peripheries with the inwardly disposed annular shoulders formed by the annular projection produced by the inwardly pressed grooves 67. The operation of this form of the invention is substantially similar to the operation of the form shown in Figs. 1 to 7, the spring washers 72—72 exerting expansive force on the two valve discs and the stop member 71 providing for a limited compression movement of one disc toward the other.

In Figs. 10 and 11 there is illustrated another modified form of valve gate, in which a helical expansion spring 73 is employed in place of the spring washers of the "Belleville" type, as illustrated in Figs. 1 to 9, this helical spring being supported at its end upon flanged bearing rings 74—74 slidably supported upon a cylindrical stop ring 75 and positioned centrally with respect to the valve discs 65 by engagement of their outer peripheral edges with the inwardly disposed annular shoulders of the annular projection produced by the inwardly pressed grooves 67. The operation of this form of the invention is substantially similar to that of the other forms, the helical spring 73 exerting expansive force upon the two valve discs, and the stop ring 75 providing for a limited compressive movement of one disc toward the other.

I have illustrated and described preferred and satisfactory embodiments of the invention, but it will be understood that changes may be made therein, within the spirit and scope thereof, as defined in the appended claims.

Having thus described my invention, what I claim and desire to secure by Letters Patent is:

1. In a gate valve, a valve body having a conduit therethrough and a valve gate chamber disposed transversely of said conduit and having opposed seat surfaces surrounding said conduit, a valve gate movably disposed in said chamber to open and close said conduit, a sealing member movably carried by said gate for axial movement therein having an annular sealing portion for engagement with one of said seat surfaces in surrounding relation to said conduit, said gate having a pressure chamber at the inner side of said sealing member, spring means arranged to exert expansive pressure on said sealing member, the pressure of said spring means being less than the calculated line pressure, stop means disposed in relation to said sealing member to limit its movement under line pressure in said conduit, said sealing member having in its sealing portion a continuous annular lubricant receiving groove and ports extending from said groove to said pressure chamber at the inner side of said member adapted to admit line pressure to said chamber to combine with said spring pressure to provide an expansive pressure in excess of said line pressure, a lubricant pressure element secured to said valve body, and lubricant passage means between said pressure element and said pressure chamber and ports of said sealing member.

2. In a gate valve, a valve body having a conduit therethrough and a valve gate chamber disposed transversely of said conduit and having opposed seat surfaces surrounding said conduit, a valve gate movably disposed in said chamber to open and close said conduit, a pair of spaced sealing members movably carried by said gate for axial movement therein each having an annular sealing portion for engagement with one of said seat surfaces in surrounding relation to said conduit, said gate having a pressure chamber at the inner side of said sealing member, spring means disposed between said sealing members to exert expansive pressure thereon, the pressure of said spring means being less than the calculated line pressure, stop means disposed in relation to said sealing members to limit their movement one toward the other under line pressure in said conduit, said sealing members each having in its sealing portion a continuous annular lubricant receiving groove and ports extending from said groove to said pressure chamber at the inner side of said member adapted to admit line pressure to said chamber to combine with said spring pressure to produce an expansive pressure in excess of said line pressure; a lubricant pressure element secured to said valve body, and lubricant passage means between said pressure element and said pressure chamber and ports of said sealing members.

3. In a gate valve, a valve body having a conduit therethrough and a valve gate chamber disposed transversely of said conduit and having opposed seat surfaces surrounding said conduit, a valve gate movably disposed in said chamber to open and close said conduit, said gate having an opening therethrough, a pair of spaced valve discs disposed in said gate opening for axial movement therein having annular sealing portions for engagement with said chamber seat surfaces in surrounding relation to said conduit, there being a pressure chamber at the inner side of said spaced valve discs, and having inwardly extending rim flanges slidably engaged with the wall of said gate opening, spring means disposed between said discs to exert expansive pressure thereon, the pressure of said spring means being less than the calculated line pressure, stop means disposed in relation to said discs to limit their movement toward each other under line pressure, said valve discs each having in its sealing portion a continuous annular lubricant receiving groove and ports extending from said groove to said pressure chamber at the inner sides of said discs adapted to admit line pressure to said chamber to combine with said spring pressure to provide an expansive pressure in excess of said line pressure, a lubricant pressure element secured to said valve body, and lubricant passage means between said pressure element and said pressure chamber at the inner sides of said discs.

4. In a gate valve, a valve body having a conduit therethrough and a valve gate chamber disposed transversely of said conduit and having opposed seat surfaces surrounding said conduit, a valve gate movably disposed in said chamber to open and close said conduit, said gate having an opening therethrough, a pair of spaced valve discs disposed in said gate opening for axial movement therein having annular sealing portions for engagement with said chamber seat surfaces in surrounding relation to said conduit, there being a pressure chamber at the inner side of said spaced valve discs, a pair of dished washer spring means disposed between said discs to exert expansive pressure thereon, the pressure of said spring means being less than the calculated line pressure, stop means disposed in relation to said discs to limit their movement toward each other under line pressure in said conduit, said valve discs each having in its sealing portion a continuous annular lubricant receiving groove and ports extending from said groove to said pressure chamber at the inner sides of said discs adapted to admit line pressure to said chamber to combine with said spring pressure to produce an expansive pressure in excess of said line pressure, a lubricant pressure element secured to said valve body, and lubricant passage means between said pressure element and said pressure chamber at the inner sides of said discs.

HARRY G. SPECHT.